US012381063B2

(12) United States Patent
Greenland et al.

(10) Patent No.: US 12,381,063 B2
(45) Date of Patent: Aug. 5, 2025

(54) X-RAY TUBE WITH IMPROVED SPECTRUM

(71) Applicant: Moxtek, Inc., Orem, UT (US)

(72) Inventors: Kasey Otho Greenland, South Jordan, UT (US); Michael S. Almond, Saratoga Springs, UT (US); Todd S. Parker, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 204 days.

(21) Appl. No.: 18/460,939

(22) Filed: Sep. 5, 2023

(65) Prior Publication Data

US 2024/0112877 A1 Apr. 4, 2024

Related U.S. Application Data

(60) Provisional application No. 63/413,144, filed on Oct. 4, 2022.

(51) Int. Cl.
*H01J 35/18* (2006.01)

(52) U.S. Cl.
CPC ....... *H01J 35/186* (2019.05); *H01J 2235/084* (2013.01); *H01J 2235/086* (2013.01); *H01J 2235/183* (2013.01)

(58) Field of Classification Search
CPC .... H01J 35/116; H01J 35/186; H01J 2235/08; H01J 2235/183
See application file for complete search history.

(56) References Cited

U.S. PATENT DOCUMENTS

| | | | | |
|---|---|---|---|---|
| 4,075,526 A * | 2/1978 | Grubis | H01J 35/32 | 378/124 |
| 6,044,130 A * | 3/2000 | Inazura | H01J 35/16 | 378/138 |
| 9,029,795 B2 * | 5/2015 | Sando | H01J 19/58 | 250/393 |
| 9,281,157 B2 * | 3/2016 | Utsumi | H01J 35/16 | |
| 9,524,846 B2 * | 12/2016 | Sato | G01N 23/04 | |
| 9,570,264 B2 * | 2/2017 | Ogura | G01N 23/04 | |
| 10,242,837 B2 * | 3/2019 | Yamada | H01J 35/116 | |
| 2014/0037055 A1 * | 2/2014 | Ogura | G01N 23/02 | 378/143 |
| 2014/0126701 A1 * | 5/2014 | Ogura | H05G 1/06 | 378/143 |
| 2014/0177800 A1 * | 6/2014 | Sato | H01J 35/186 | 378/143 |

(Continued)

*Primary Examiner* — Thomas R Artman
(74) *Attorney, Agent, or Firm* — Thorpe North & Western, LLP

(57) ABSTRACT

X-rays can be used for material identification. X-ray beam purity, target adhesion the x-ray window, and a robust hermetic seal of the x-ray window are useful. To achieve these objectives, a target 17 can be mounted by an adhesion-layer 16 on the x-ray window. The adhesion-layer 16 can include chromium. A sealing-layer 13 can seal the x-ray window to a flange 19. Material of the sealing-layer 13 can be different from material of the adhesion-layer 16. There can be a gap 21 between the flange 19 and the target 17. There can be a conductive-layer 18 on the x-ray window 14 in the gap 21. A thickness Ts of the adhesion-layer 16 between the sealing-layer 13 and the x-ray window 14 can be different than a thickness Tt of the adhesion-layer 16 between the target 17 and the x-ray window 14.

20 Claims, 11 Drawing Sheets

(56) References Cited

U.S. PATENT DOCUMENTS

| | | | | |
|---|---|---|---|---|
| 2014/0203183 A1* | 7/2014 | Sando | H01J 19/58 | 313/310 |
| 2014/0211919 A1* | 7/2014 | Ogura | H01J 35/02 | 378/62 |
| 2014/0226787 A1* | 8/2014 | Utsumi | H01J 35/12 | 378/124 |
| 2016/0133430 A1* | 5/2016 | Yamada | H01J 35/116 | 378/143 |
| 2024/0112877 A1* | 4/2024 | Greenland | H01J 35/186 | |

* cited by examiner

X-RAY TUBE WITH IMPROVED SPECTRUM

CLAIM OF PRIORITY

This application claims priority to U.S. Provisional Patent Application No. 63/413,144, filed on Oct. 4, 2022, which is incorporated herein by reference.

FIELD OF THE INVENTION

The present application is related to x-ray sources.

BACKGROUND

X-rays have many uses, including imaging, x-ray fluorescence analysis, x-ray diffraction analysis, and electrostatic dissipation.

A large voltage between a cathode and an anode of an x-ray tube, and sometimes a heated filament, can cause electrons to emit from the cathode to the anode. The anode can include a target. The target can generate x-rays in response to impinging electrons from the cathode.

BRIEF DESCRIPTION OF THE DRAWINGS (DRAWINGS MIGHT NOT BE DRAWN TO SCALE)

Figure 1:
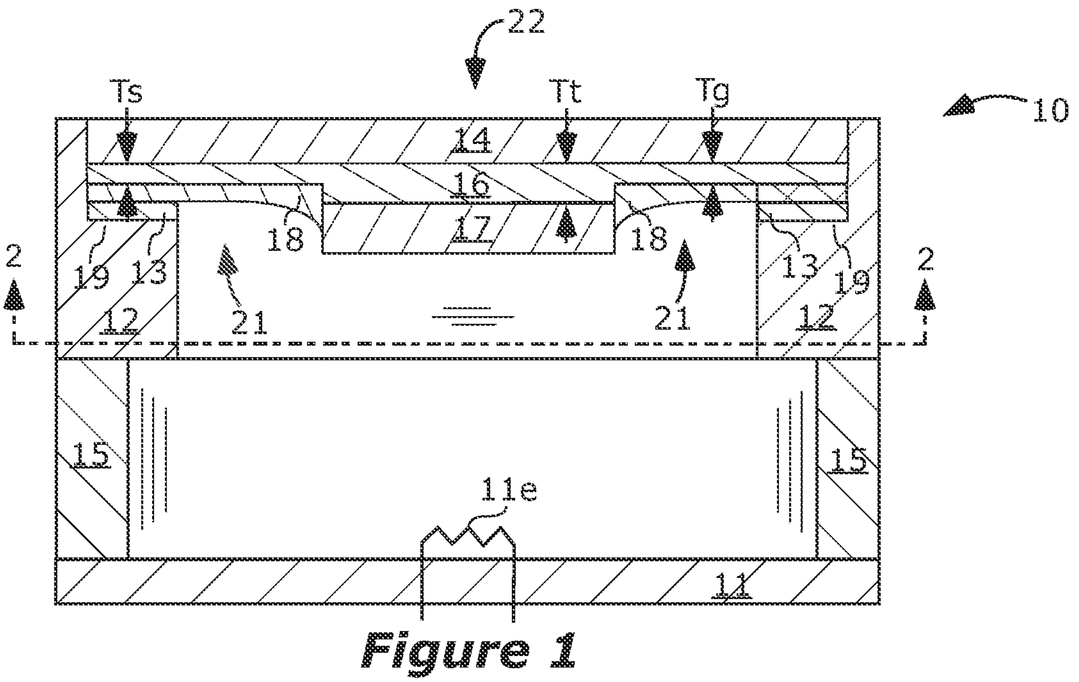

FIG. 1 is a cross-sectional side-view of an x-ray tube 10 with an x-ray window 14 sealed to a flange 19. A target 17 can be mounted by an adhesion-layer 16 on an x-ray window 14. The adhesion-layer 16 can have multiple, different thicknesses (Ts≠Tt, Tg≠Tt). There can be a gap 21 between the flange 19 and the target 17. There can be a conductive-layer 18 on the adhesion-layer 16 in the gap 21.

Figure 2:
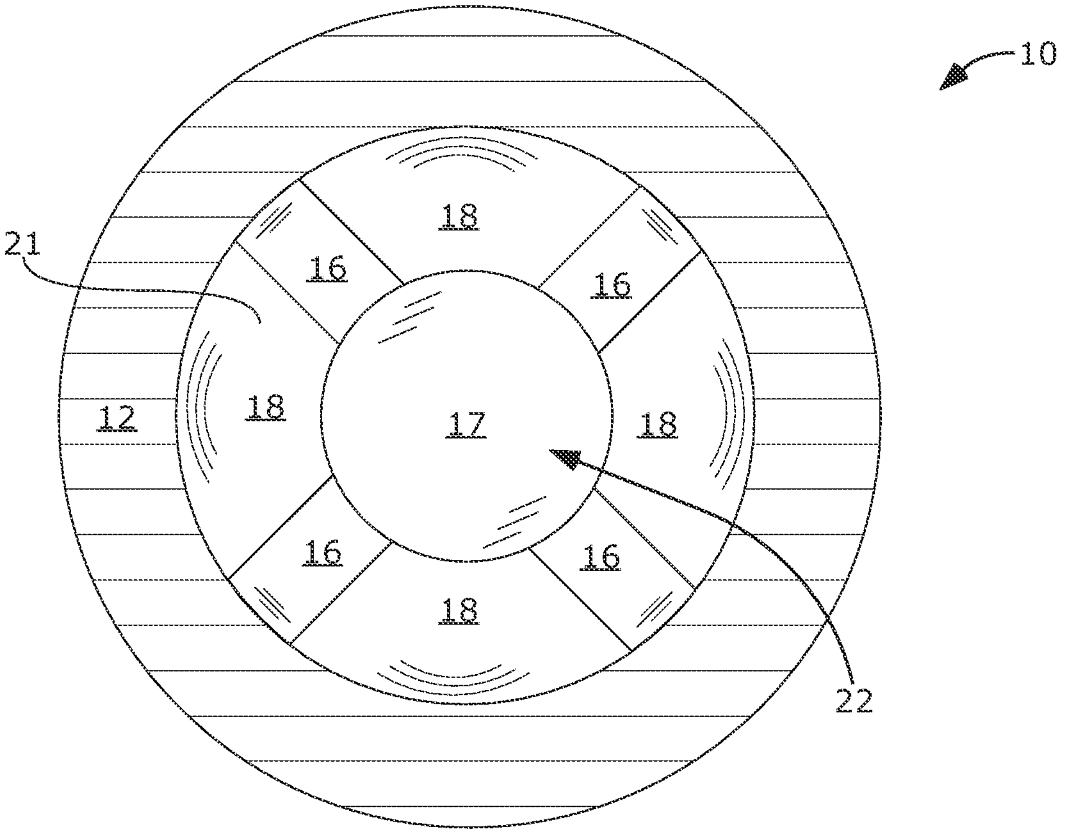

FIG. 2 is a top-view of the x-ray tube 10 of FIG. 1, taken along line 2-2 in FIG. 1.

Figure 3:
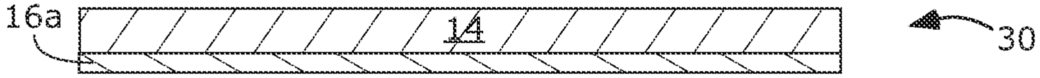

FIG. 3 is a cross-sectional side-view of a step 30 in a method of assembling an x-ray window 14 with a target 17, including depositing a first-adhesion-layer **16*a* on the x-ray window 14**.

Figure 4:
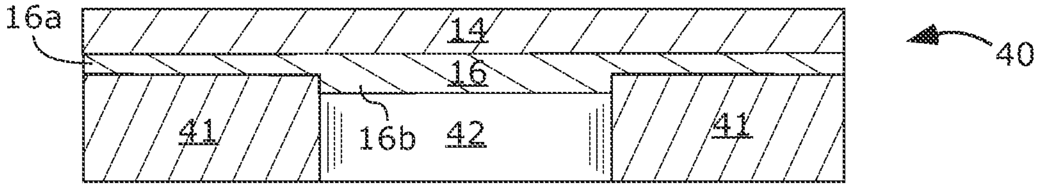

FIG. 4 is a cross-sectional side-view of a step 40 in a method of assembling an x-ray window 14 with a target 17, which can follow step 30, including depositing a second-adhesion-layer **16*b* in an opening 42 of a mask 41**.

Figure 5:
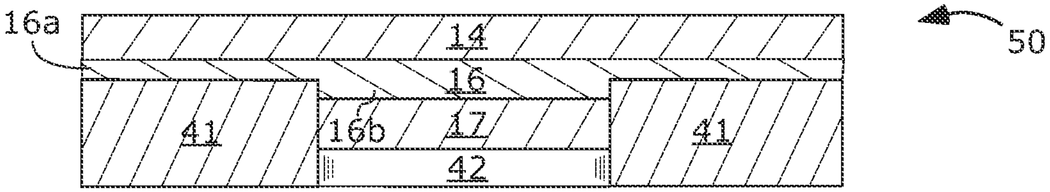

FIG. 5 is a cross-sectional side-view of a step 50 in a method of assembling an x-ray window 14 with a target 17, which can follow step 40, including depositing a target 17 on the second-adhesion-layer **16*b* in the opening 42 of the mask 41**.

Figure 6:
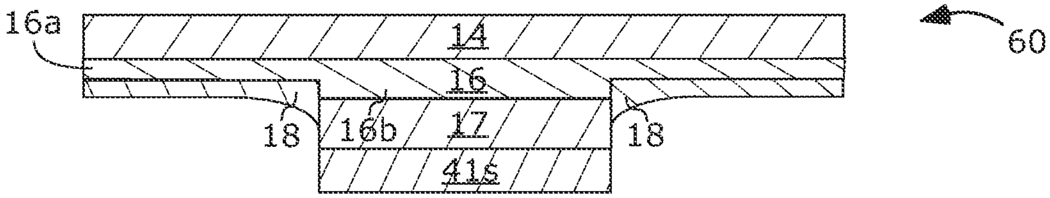

FIG. 6 is a cross-sectional side-view of a step 60 in a method of assembling an x-ray window 14 with a target 17, which can follow step 50, including removing the mask 41 of step 50, applying a second mask **41*s* on the target 17, then applying a conductive-layer 18 on the adhesion-layer 16 between the target 17 and at an outer perimeter of the x-ray window 14**.

Figure 7:
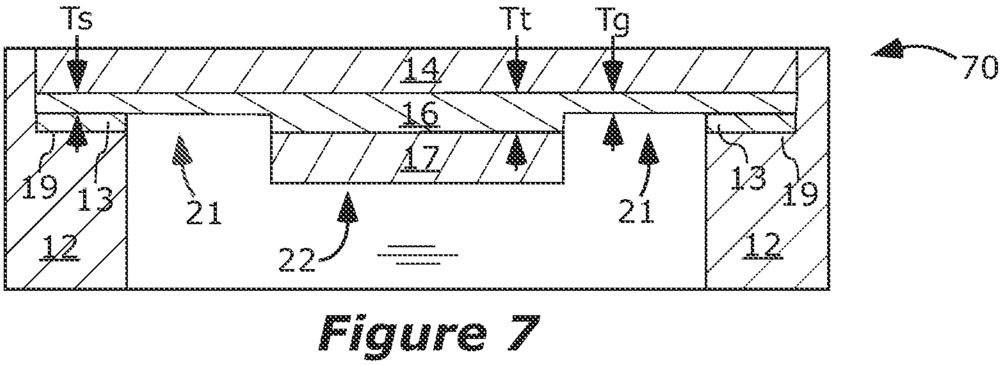

FIG. 7 is a cross-sectional side-view of a step 70 in a method of assembling an x-ray window 14 with a target 17, which can follow step 50 or step 60, including mounting the x-ray window on a flange 19 of an anode 12 for an x-ray tube by a sealing-layer 13.

Figure 8:
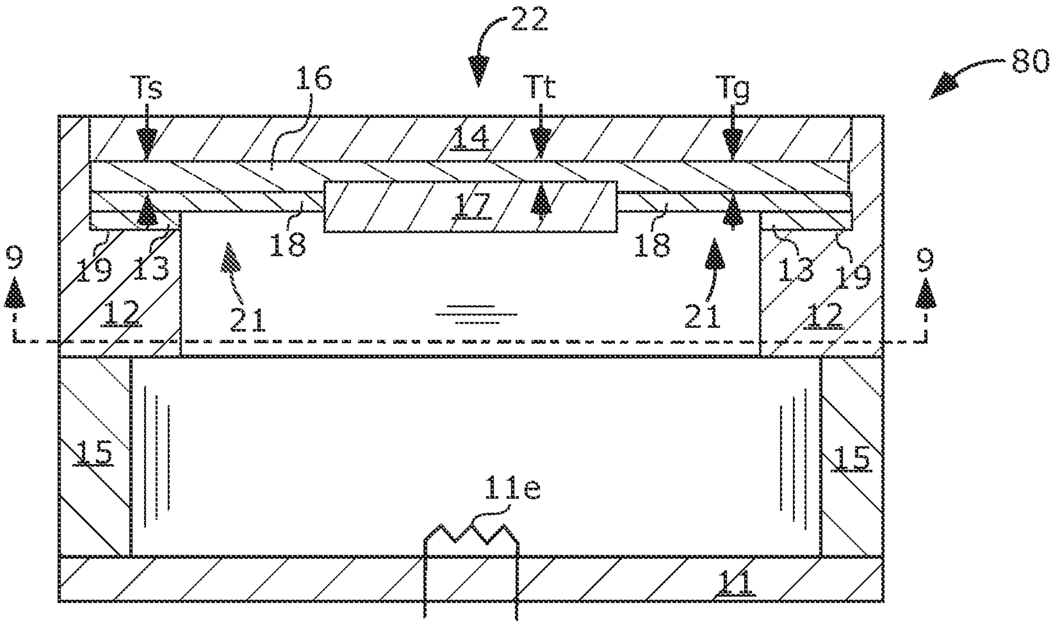

FIG. 8 is a cross-sectional side-view of an x-ray tube 80 with an x-ray window 14 sealed to a flange 19. A target 17 can be mounted by an adhesion-layer 16 on an x-ray window 14. The adhesion-layer 16 can have multiple, different thicknesses (Ts≠Tt, Tg≠Tt). There can be a conductive-layer 18 on the adhesion-layer 16 in a gap 21 between the flange 19 and the target 17.

Figure 9:
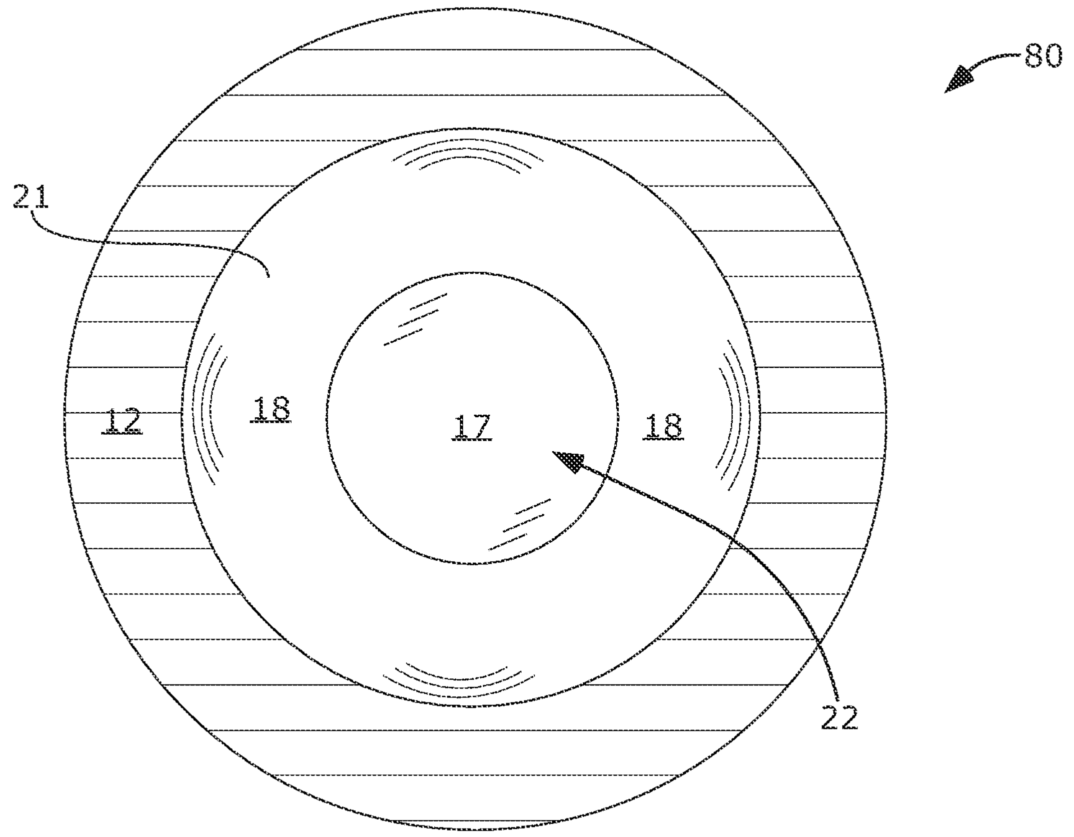

FIG. 9 is a top-view of the x-ray tube 80 of FIG. 8, taken along line 9-9 in FIG. 8.

Figure 10:
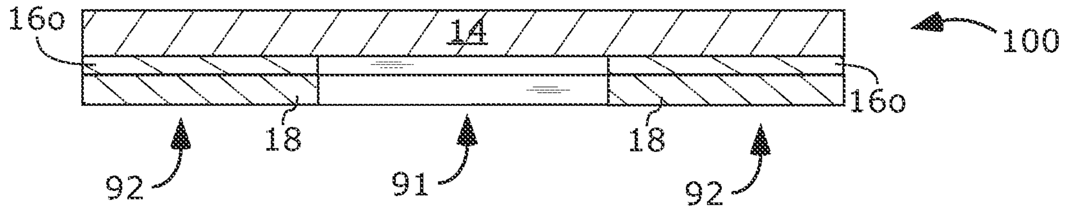

FIG. 10 is a cross-sectional side-view of a step 100 in a method of assembling an x-ray window 14 with a target 17, including depositing an outer-adhesion-layer **16*o* on the x-ray window 14, then depositing a conductive-layer 18 on the outer-adhesion-layer 16*o*. The outer-adhesion-layer 16*o* and the conductive-layer 18 can be deposited in a ring 92. The ring 92 can encircle an aperture 91**.

Figure 11:
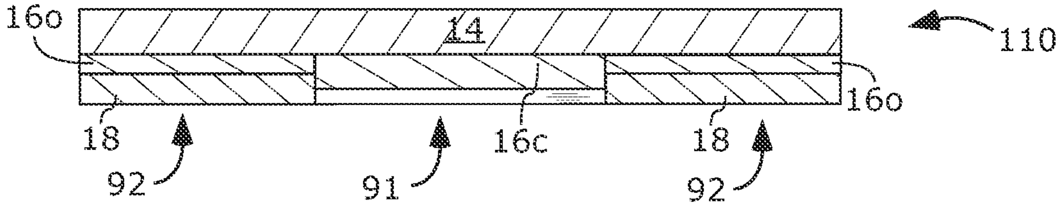

FIG. 11 is a cross-sectional side-view of a step 110 in a method of assembling an x-ray window 14 with a target 17, which can follow or precede step 100, including depositing a central-adhesion-layer **16*c* on the x-ray window 14 in an aperture 91, encircled by a ring 92**.

Figure 12:
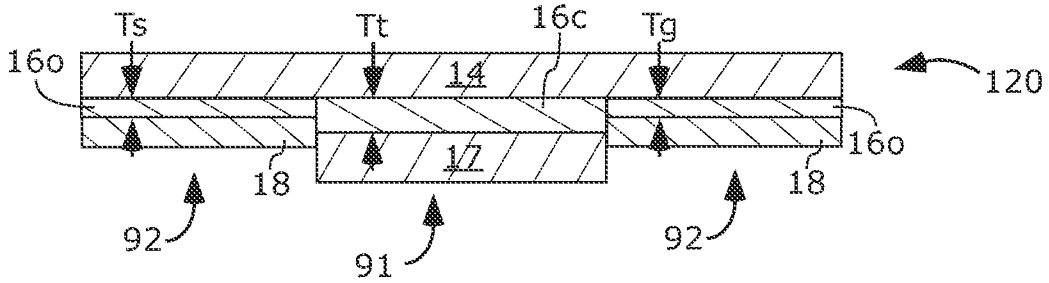

FIG. 12 is a cross-sectional side-view of a step 120 in a method of assembling an x-ray window 14 with a target 17, which can follow step 110, including depositing a target 17 on the central-adhesion-layer **16*c***.

Figure 13:
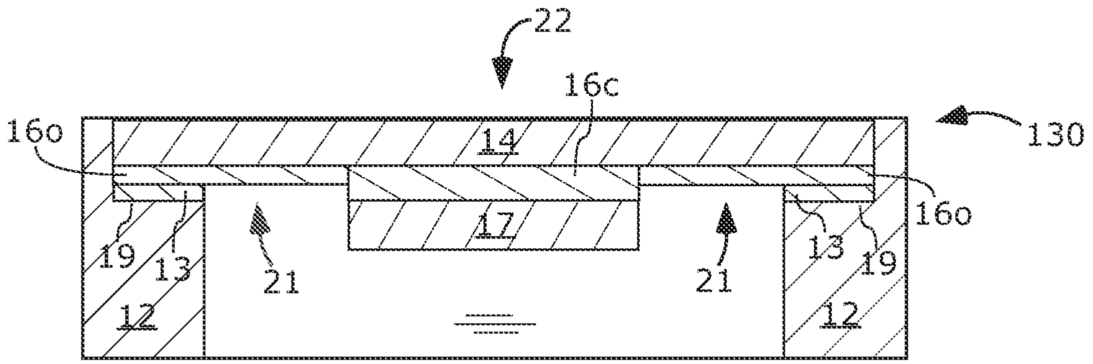

FIG. 13 is a cross-sectional side-view of a step 130 in a method of assembling an x-ray window 14 with a target 17, which can follow step 120, including mounting the x-ray window on a flange 19 of an anode 12 for an x-ray tube by a sealing-layer 13.

Figure 14:
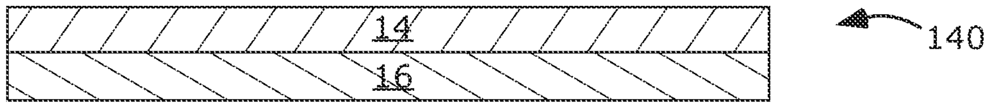

FIG. 14 is a cross-sectional side-view of a step 140 in a method of assembling an x-ray window 14 with a target 17, including depositing an adhesion-layer 16 on the x-ray window 14.

Figure 15:
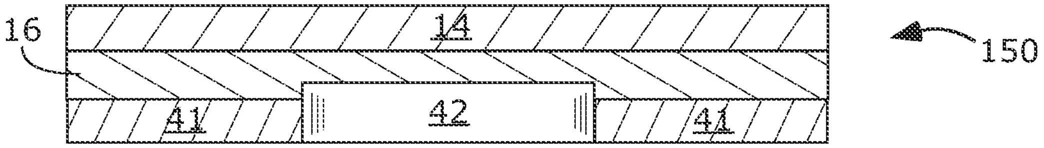

FIG. 15 is a cross-sectional side-view of a step 150 in a method of assembling an x-ray window 14 with a target 17, which can follow step 140, including depositing a mask 41 on the adhesion-layer 16, then etching the adhesion-layer 16 at an opening 42 of the mask.

Figure 16:
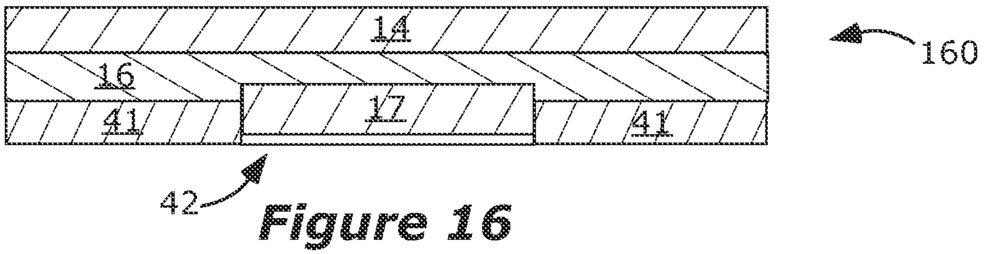

FIG. 16 is a cross-sectional side-view of a step 160 in a method of assembling an x-ray window 14 with a target 17, which can follow step 150, including depositing a target 17 on the adhesion-layer 16 at the opening 42 of the mask 41.

Figure 17:
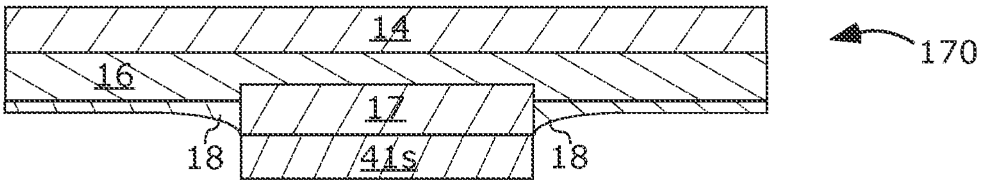

FIG. 17 is a cross-sectional side-view of a step 170 in a method of assembling an x-ray window 14 with a target 17, which can follow step 160, including removing the mask 41, applying a second mask **41*s* on the target 17, then depositing a conductive-layer 18 on the adhesion-layer 16 encircling the target 17**.

Figure 18:
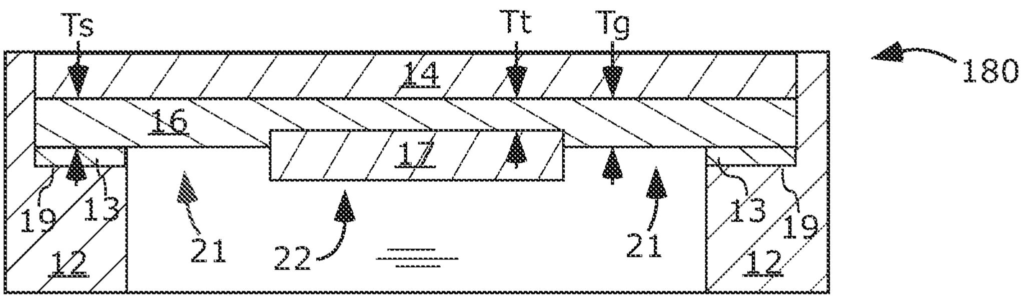

FIG. 18 is a cross-sectional side-view of a step 180 in a method of assembling an x-ray window 14 with a target 17, which can follow step 160 or step 170, including removing the mask 41 or the second mask **41*s*, then mounting the x-ray window 14 on a flange 19 of an anode 12 for an x-ray tube by a sealing-layer 13**.

Figure 19:
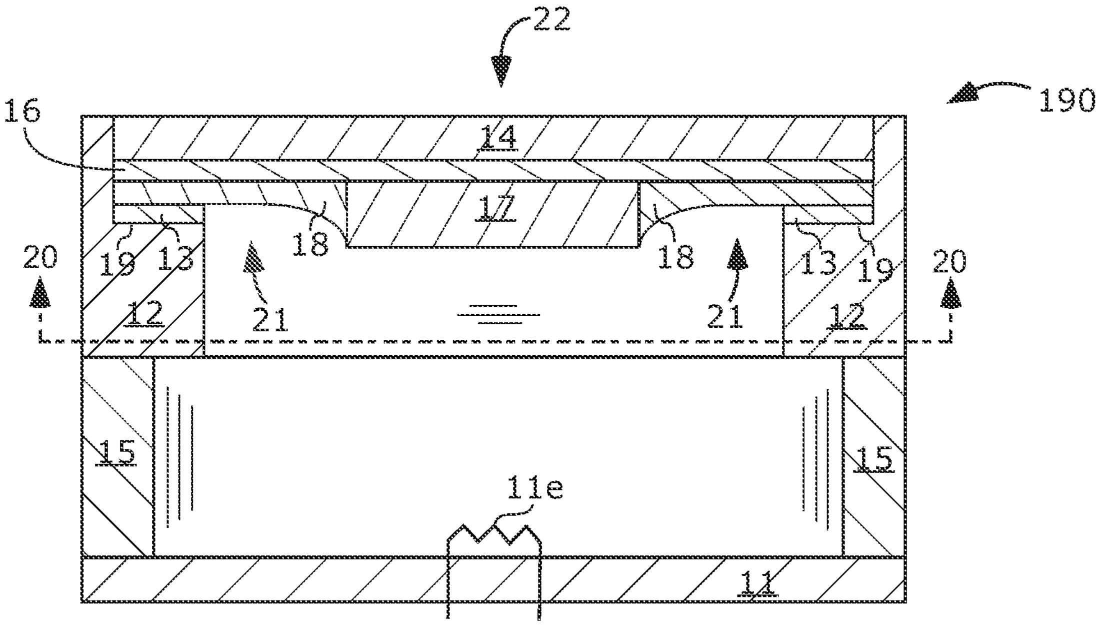

FIG. 19 is a cross-sectional side-view of an x-ray tube 190 with an x-ray window 14 sealed to a flange 19. A target 17 can be mounted by an adhesion-layer 16 on an x-ray window 14. There can be a gap 21 between the flange 19 and the target 17. There can be a conductive-layer 18 on the adhesion-layer 16 and/or on the x-ray window 14 in the gap 21. The adhesion-layer 16 can span the gap 21 from the target 17 to a sealing-layer 13 at a perimeter of the x-ray window 14.

Figure 20:
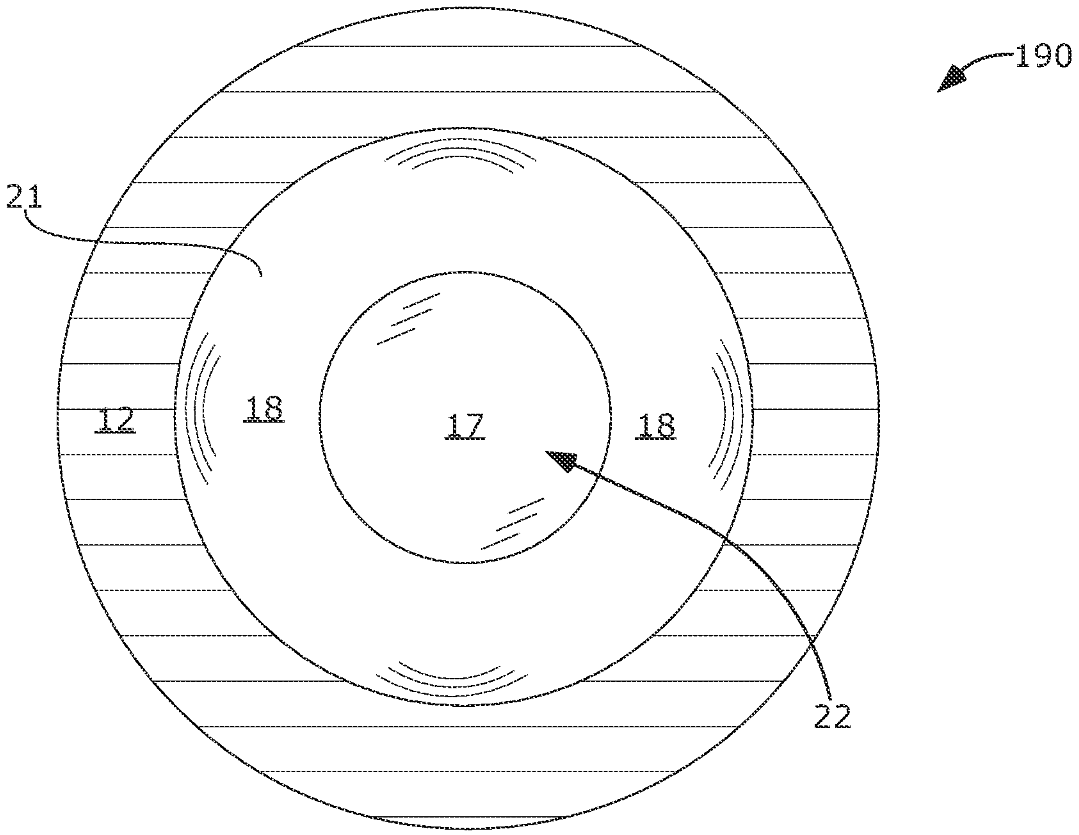

FIG. 20 is a top-view of the x-ray tube 190 of FIG. 19, taken along line 20-20 in FIG. 19.

Figure 21:
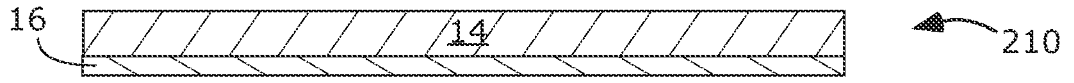

FIG. 21 is a cross-sectional side-view of a step 210 in a method of assembling an x-ray window 14 with a target 17, including depositing an adhesion-layer 16 across a face of the x-ray window 14.

Figure 22:
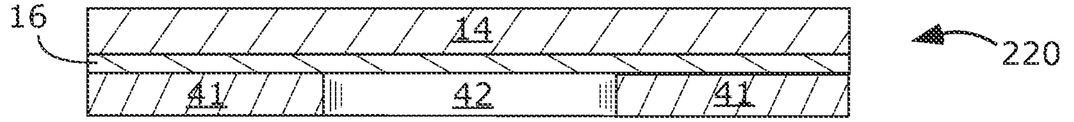

FIG. 22 is a cross-sectional side-view of a step 220 in a method of assembling an x-ray window 14 with a target 17, which can follow step 210, including applying a mask 41 on the adhesion-layer 16. The mask 41 can have an opening 42 that exposes the adhesion-layer 16.

Figure 23:
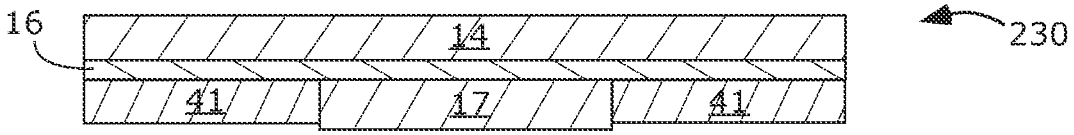

FIG. 23 is a cross-sectional side-view of a step 230 in a method of assembling an x-ray window 14 with a target 17, winch can follow step 220, including depositing a target 17 on the adhesion-layer 16 in the opening 42 of the mask 41.

Figure 24:
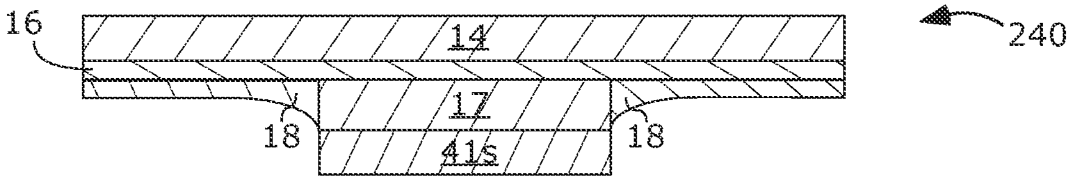

FIG. 24 is a cross-sectional side-view of a step 240 in a method of assembling an x-ray window 14 with a target 17, which can follow step 230, including removing the mask 41, applying a second mask 41*s* on the target 17, then applying a conductive-layer 18 on the adhesion-layer 16 at an outer perimeter of the target 17.

Figure 25:
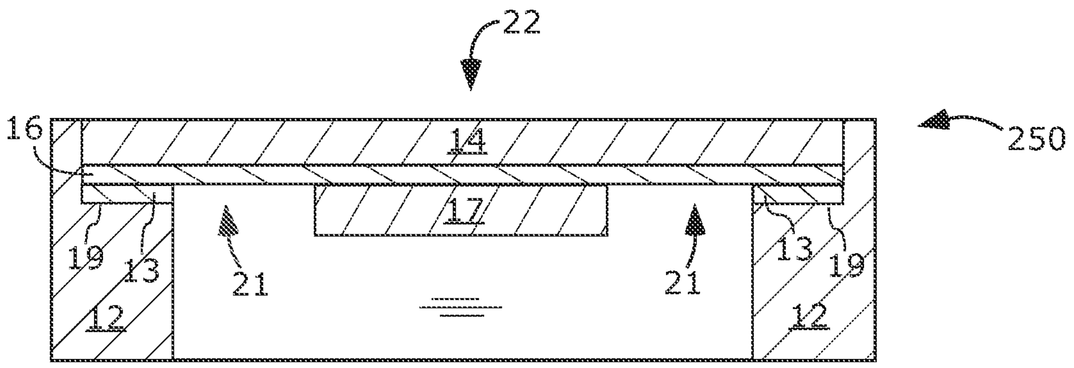

FIG. 25 is a cross-sectional side-view of a step 250 in a method of assembling an x-ray window 14 with a target 17, which can follow step 230 or step 240, including mounting the x-ray window on a flange 19 of an anode 12 for an x-ray tube by a sealing-layer 13.

Figure 26:
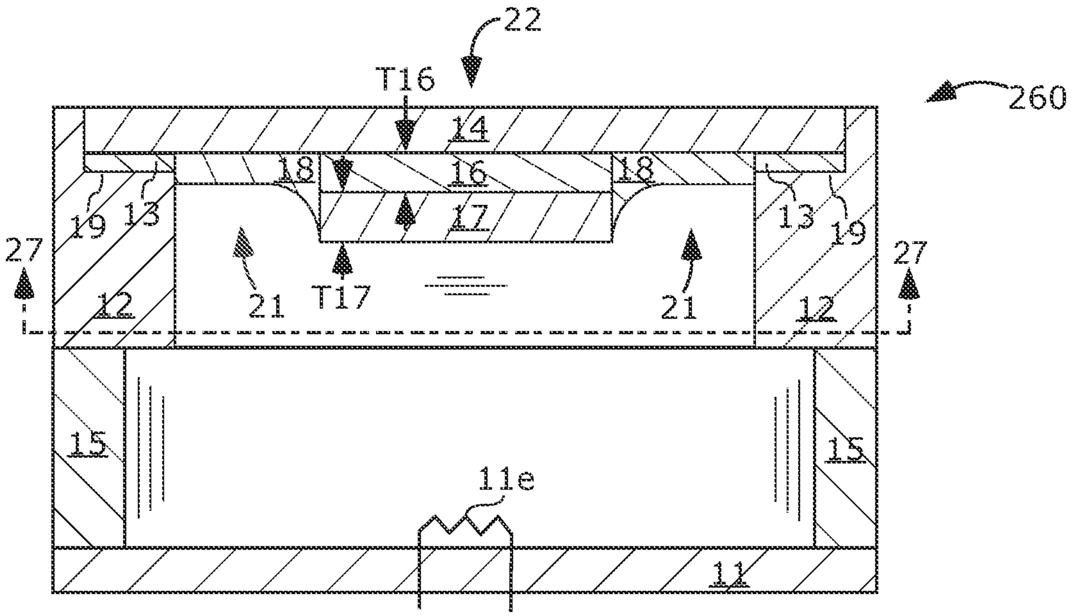

FIG. 26 is a cross-sectional side-view of an x-ray tube 260 with an x-ray window 14 sealed to a flange 19. A target 17 can be mounted by an adhesion-layer 16 on an x-ray window 14. There can be a gap 21 between the flange 19 and the target 17 and between the flange 19 and the adhesion-layer 16. There can be a conductive-layer 18 on the x-ray window 14 in the gap 21.

Figure 27:
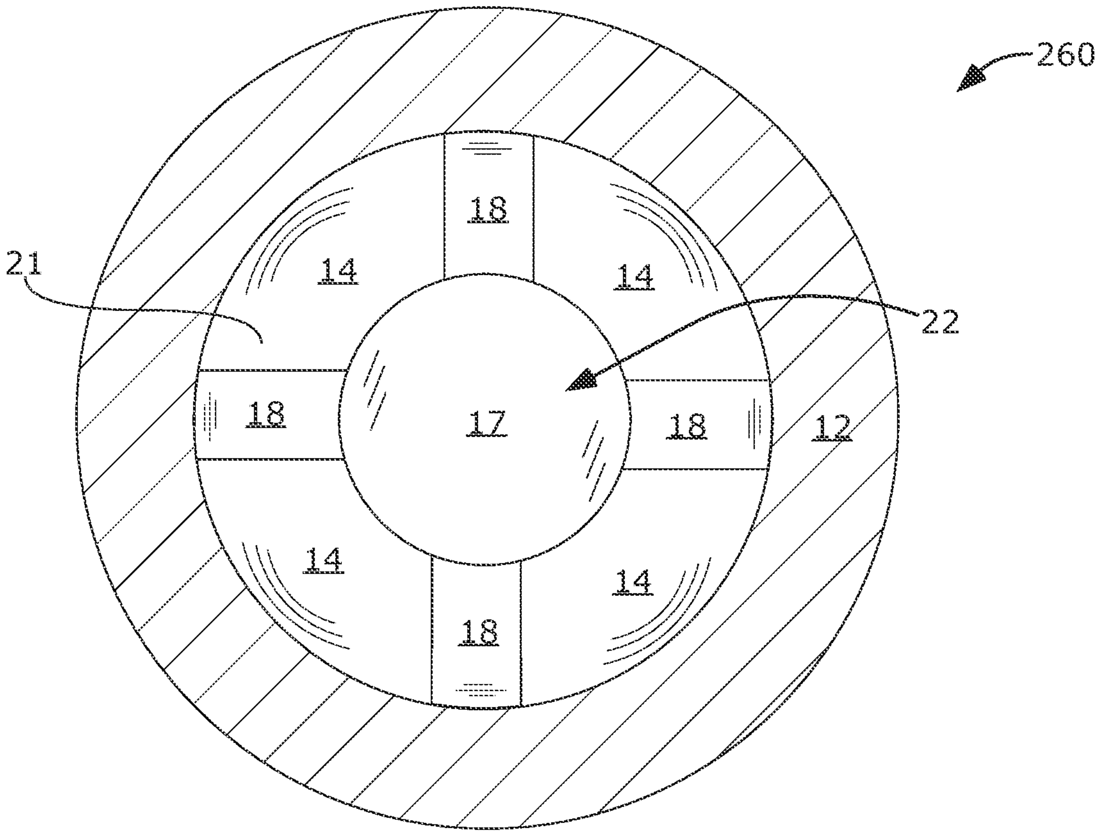

FIG. 27 is a top-view of the x-ray tube 260 of FIG. 26, taken along line 27-27 in FIG. 26.

Figure 28:
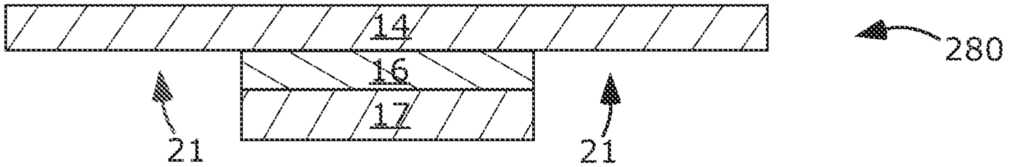

FIG. 28 is a cross-sectional side-view of a step 280 in a method of assembling an x-ray window 14 with a target 17, including depositing an adhesion-layer 16 on an x-ray window 14, then depositing a target 17 on the adhesion-layer 16. A gap 21 can encircle the adhesion-layer 16 and the target 17.

Figure 29:
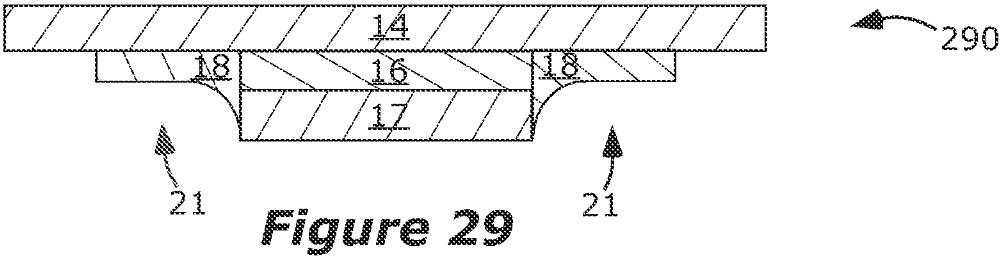

FIG. 29 is a cross-sectional side-view of a step 290 in a method of assembling an x-ray window 14 with a target 17, which can follow step 280, including depositing a conductive-layer 18 on the x-ray window 14 in the gap 21.

Figure 30:
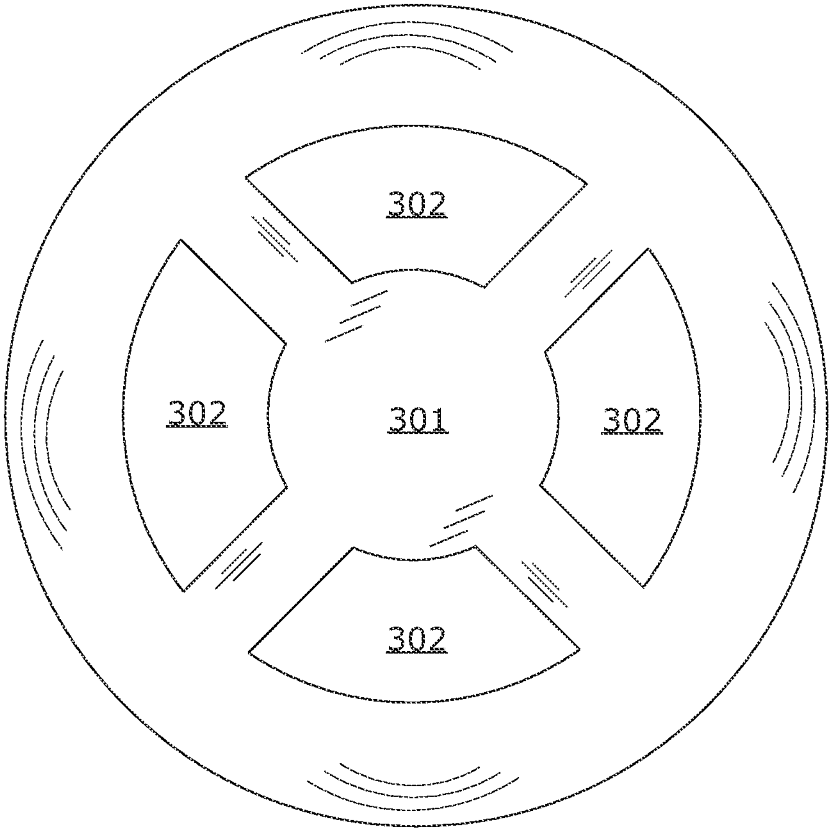

FIG. 30 is a top-view of a mask 301 that can be used in method step 60 or step 290. The mask 301 includes openings 302 where the conductive-layer 18 can be deposited.

Figure 31:
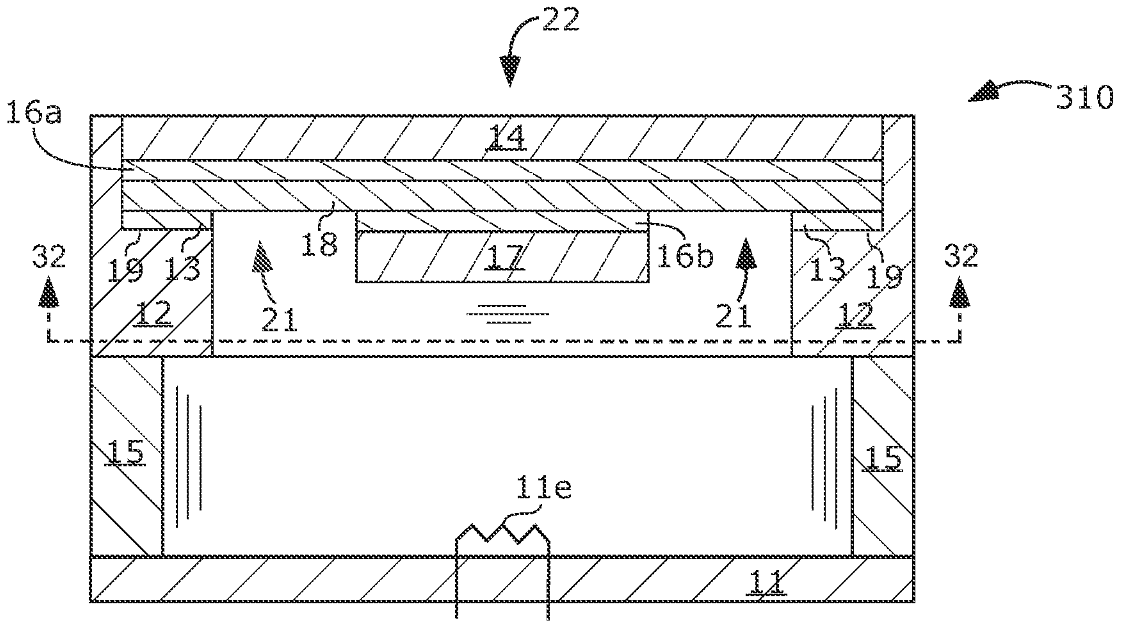

FIG. 31 is a cross-sectional side-view of an x-ray tube 310 with an x-ray window 14 sealed to a flange 19. A stack of layers at a center of the x-ray window 14 can include the x-ray window 14, a first-adhesion-layer 16*a*, a conductive-layer 18, a second-adhesion-layer 16*b*, then a target 17.

Figure 32:
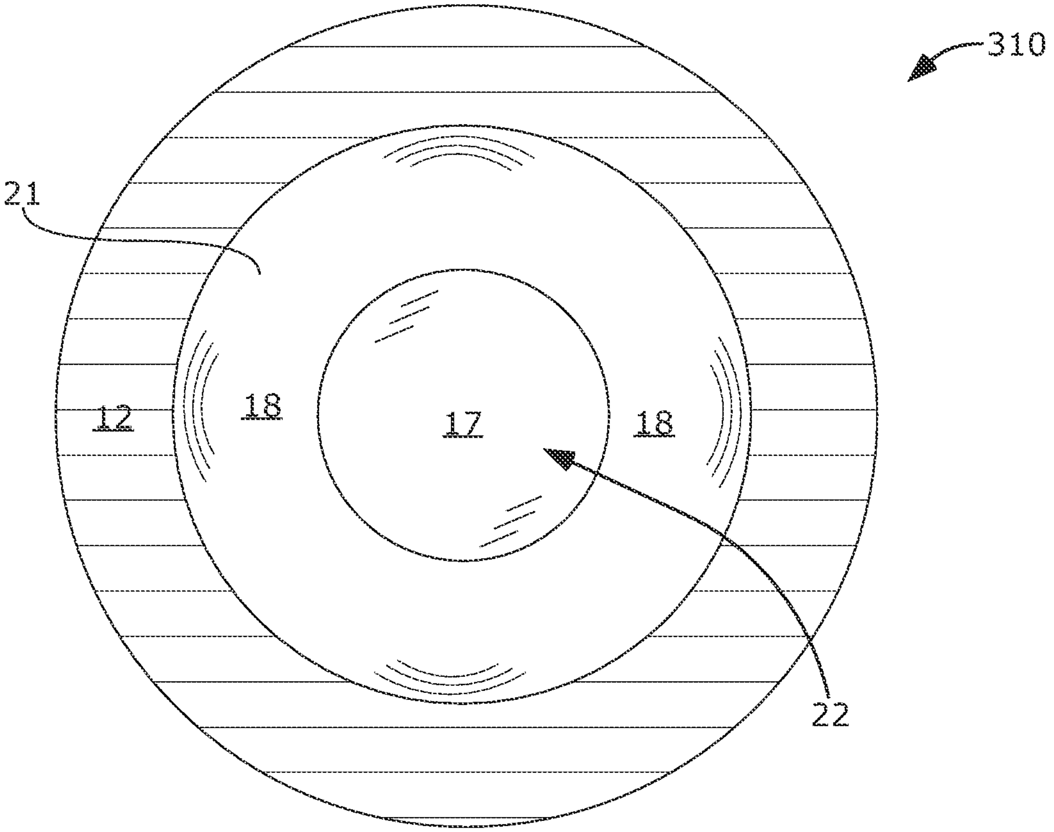

FIG. 32 is a top-view of the x-ray tube 310 of FIG. 31, taken along line 32-32 in FIG. 31.

Figure 33:
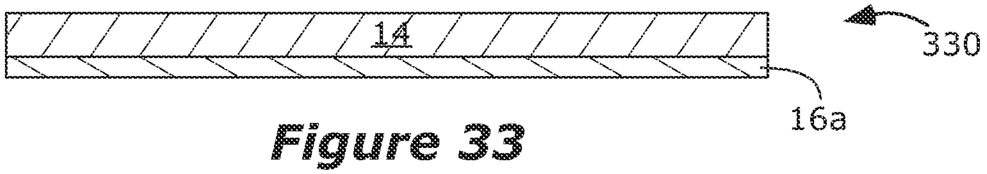

FIG. 33 is a cross-sectional side-view of a step 330 in a method of assembling an x-ray window 14 with a target 17, including depositing a first-adhesion-layer 16*a* on an x-ray window 14.

Figure 34:
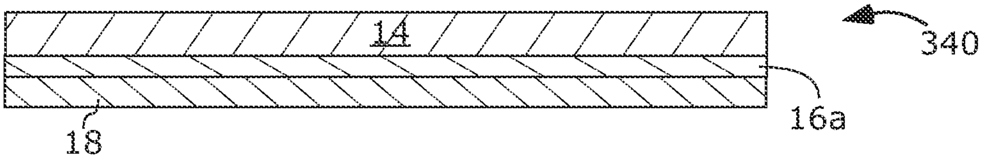

FIG. 34 is a cross-sectional side-view of a step 340 in a method of assembling an x-ray window 14 with a target 17, which can follow step 330, including depositing a conductive-laver 18 on the first-adhesion-laver 16*a*.

Figure 35:
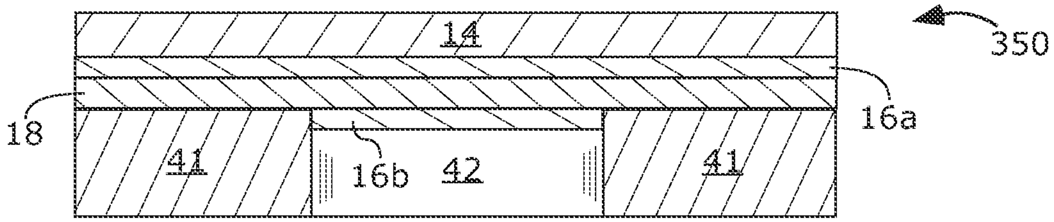

FIG. 35 is a cross-sectional side-view of a step 350 in a method of assembling an x-ray window 14 with a target 17, which can follow step 340, including applying a mask 41 on the conductive-layer 18, with an opening 42 of the mask 41, then depositing a second-adhesion-layer 16*b* on the conductive-layer 18 in the opening 42 of the mask 41.

Figure 36:
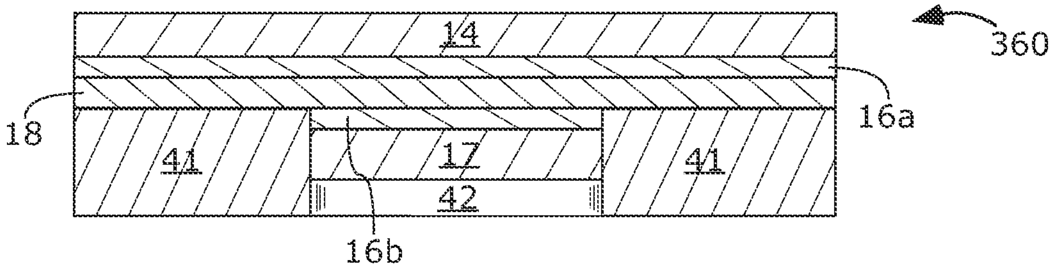

FIG. 36 is a cross-sectional side-view of a step 360 in a method of assembling an x-ray window 14 with a target 17, which can follow step 350, including depositing a target 17 on the second-adhesion-layer 16*b* in the opening 42 of the mask 41.

REFERENCE NUMBERS IN THE DRAWINGS x-ray tube 10, 80, 190, 260, 310
cathode 11
electron-emitter 11*e*
anode 12
sealing-layer 13
x-ray window 14
cylinder 15
adhesion-layer 16
first-adhesion-layer 16*a*
second-adhesion-layer 16*b*
central-adhesion-layer 16*c*
outer-adhesion-layer 16*o*
target 17
conductive-layer 18
flange 19
gap 21
aperture 22
mask 41
second mask 41*s*
opening 42
mask 301
opening 302
thicknesses T16, Ts, Tt, Tg of the adhesion-layer 16
thickness T17 of the target 17

Definitions. The following definitions, including plurals of the same, apply throughout this patent application.

As used herein, the phrase "opening of the mask" refers an opening or aperture at an interior region of the mask, but is not necessarily located at an exact center of the mask. The term "center" is used to distinguish from an edge.

As used herein, the term "encircling" means forming a ring around the item encircled, but is not limited to a circular shape.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "x-ray tube" is not limited to tubular/cylindrical shaped devices. The term "tube" is used because this is the standard term used for x-ray emitting devices.

DETAILED DESCRIPTION

As illustrated in the figures, an x-ray tube can include a cathode 11 (with an electron-emitter 11*e*) and an anode 12 electrically-insulated from each other (e.g. by a glass or ceramic cylinder 15). The anode 12 can include a target 17. The target 17 faces the electron-emitter 11*e* and can generate x-rays in response to impinging electrons from an electron-emitter 11*e*.

The x-rays can be used for material identification. An x-ray beam, from an x-ray tube, with expected energy peaks, can hit a sample. X-rays fluoresced by the sample can be analyzed, to determine sample composition. If the x-ray beam from the x-ray tube includes undesired or unexpected energy peaks, then material analysis can be incorrect.

Therefore, it can be useful to avoid generation of x-rays from any x-ray tube material besides the target 17. X-rays generated by any x-ray tube material besides the target 17 can contaminate the x-ray beam. X-ray contamination by some materials is worse than by other materials.

Strong adhesion of the target 17 to the x-ray window 14 is useful. If adhesion is weak, then the x-ray tube can fail.

A robust hermetic seal of the x-ray window 14 is useful. If this hermetic seal fails, then the x-ray tube can fail.

The x-ray window 14 and target 17 construction and method described herein can avoid contamination of the x-ray beam, can provide strong adhesion of the target 17 to the x-ray window 14, and can provide a robust hermetic seal of the x-ray window 14.

The anode 12 can include a flange 19 encircling an aperture 22. The x-ray window 14 can be hermetically-sealed to the flange 19. The x-ray window 14 can span the aperture 22. A target 17 can be mounted by an adhesion-layer 16 on a center of the x-ray window 14 in the aperture 22.

The x-ray window 14 can be hermetically-sealed to the flange 19 by a sealing-layer 13. If material of the sealing-layer 13 is similar to material of the target 17 and/or the adhesion-layer 16, then material of the sealing-layer 13 can wick or diffuse into the aperture 22. If a precious metal or titanium, from the target 17 or the adhesion-layer 16 touch the sealing-layer 13 with titanium, then sealing-layer 13 materials can wick or diffuse into the aperture 22. In either case, x-rays can then be generated from material of the sealing-layer 13. These x-rays can contaminate the x-ray beam.

To avoid this problem, and provide a purer x-ray beam, the sealing-layer 13 can be substantially different than the target 17 and/or the adhesion-layer 16. This difference can minimize inter-diffusion or wicking of material of the sealing-layer 13 with material of the target 17 and/or the adhesion-layer 16.

For example, ≥80, ≥90, ≥95, ≥99, or 100 weight percent of chemical elements of the sealing-layer 13 can be different from chemical elements of the target 17, the adhesion-layer 16, or both.

The sealing-layer 13 can form a hermetic seal by brazing. Thus, the sealing-layer 13 can be a brazed joint or seal. The sealing-layer 13 can include silver, copper, or both. The sealing-layer 13 can exclude titanium. A large percent (e.g. ≥95, ≥99, or 100 weight percent) of the sealing-layer 13 can be silver, copper, or both.

As another example, ≥95, ≥99, or 100 weight percent of the sealing-layer 13 can be silver, copper, titanium, or combinations thereof, but the target 17 and the adhesion-layer 16 can be spaced apart from the sealing-layer 13 and/or can be made of a material that excludes titanium.

There can be a gap 21 between the flange 19 and the target 17. The gap 21 can be annular. The gap 21 can encircle the target 17. The gap 21 can be free of the target 17. The target 17 can be spaced apart from the sealing-layer 13. Thus, the sealing-layer does not adjoin or is in a non-contacting relationship with the target 17 in such examples.

The target 17 can include a precious metal, such as gold, silver, platinum, palladium, rhodium, ruthenium, iridium, osmium, or combinations thereof. At least 80, 90, 95, or 99 mass percent of the target can be a precious metal. Use of such precious metal is allowed by the gap 21 between the target 17 and the sealing-layer 13. Even if there is some material similarity between the sealing-layer 13 and the target 17, interdiffusion of materials can be avoided. Example thicknesses T17 (see FIG. 26) of the target 17 include ≥0.5 μm and ≤10 μm.

The adhesion-layer 16 can include titanium, particularly if the adhesion-layer 16 is spaced apart from the sealing-layer 13 (see FIG. 26), or if the sealing-layer 13 does not include titanium. As illustrated in FIG. 26, there can be a gap 21 between the flange 19 and the adhesion-layer 16. The gap 21 can be free of the adhesion-layer 16. The gap 21 can encircle the adhesion-layer 16.

The sealing-layer 13 can be free of titanium, and/or the adhesion-layer 16 can be free of titanium. The adhesion-layer 16 can include chromium. For example, the adhesion-layer 16 can include ≥85, ≥90, ≥95, or ≥99 mass percent chromium. Chromium is preferred for strong adhesion of the target 17. Example thicknesses T16 (see FIG. 26) of the adhesion-layer 16 include ≥10 nm and ≤100 nm.

The adhesion-layer 16 can span the gap 21 from the target 17 to the sealing-layer 13, to the flange 19, or both (see FIGS. 1, 8, 19, and 31). The adhesion-layer 16 can adjoin the sealing-layer 13, the flange 19, or both.

There can be a conductive-layer 18 on the x-ray window 14 in the gap 21. The conductive-layer 18 is optional in all examples described herein. The conductive-layer 18 can extend from the target 17 to the flange 19.

The conductive-layer 18 can extend across the flange 19, and can be sandwiched between the sealing-layer 13 and the x-ray window 14, as illustrated in FIGS. 1, 8, 19, and 31. This is preferred for manufacturability because an outer ring does not need to be masked to block deposition of the conductive-layer 18.

Alternatively, the conductive-layer 18 can terminate at an inner edge of the flange 19 and the sealing-layer 13, as illustrated in FIG. 26. This is preferred if material of the conductive-layer 18 is incompatible with the hermetic seal.

The conductive-layer 18 can be electrically conductive, and can provide an electrical connection between the target 17 and the flange 19. Thus, it is preferable to have a conductive-layer 18 if the x-ray window 14 is electrically insulative.

The conductive-layer 18 can include tungsten, molybdenum, or both. X-rays generated in chromium can be more problematic than x-rays generated in tungsten or molybdenum. Therefore, covering a chromium adhesion-layer 16 with tungsten or molybdenum can improve the x-ray spectrum. The conductive-layer 18 is preferred for x-ray tubes 10, 80, 190 and 310, because the adhesion-layer 16 spans the gap 21 in these examples. The conductive-layer 18 can thus cover the adhesion-layer 16 in these examples, and minimize x-ray beam contamination.

As illustrated in FIG. 27, the conductive-layer 18 can cover a small portion of the gap 21, such as for example ≥5% and ≤50%. In this example, the x-ray window 14 can be electrically-insulative, and the conductive-layer 18 can provide electrical connection between the target 17 and the anode 12. The adhesion-layer 16 does not extend into the gap 21. Thus, the gap does not need to be fully covered by the conductive-layer 18. Therefore, in this example, only small channel(s) of conductive-layer 18 are needed for electrical connection.

As illustrated on x-ray tubes 10, 80, 190 and 310, the conductive-layer 18 can cover a large portion of the gap 21, such as for example ≥50%, ≥75%, or even all, of the gap 21. In these examples, the conductive-layer 18 is used to cover the adhesion-layer 16. Covering all of the adhesion-layer 16 in the gap 21 is preferable, but masking is easier for the example of FIG. 2. A mask 301 is illustrated in FIG. 30 with openings 302 where the conductive-layer 18 can be deposited. This can form the conductive-layer 18 into a shape as illustrated in FIG. 2.

The x-ray window 14 can include diamond. For example, the x-ray window 14 can include ≥85, ≥90, ≥95, or ≥99 mass percent diamond. The x-ray window 14 can be electrically insulative. The x-ray window 14 can be electrically conductive. The x-ray window 14 can include beryllium, aluminum, or other electrically conductive materials.

There are tradeoffs of advantages and disadvantages of each example described herein. Following are specific examples and the advantages and disadvantages of each.

In the following method, the steps can be performed in the order described. Components can have properties as described above. Sputter deposition may be used for the deposition steps. A method of assembling an x-ray window 14 with a target 17 can include some or all of the following steps:

- depositing an adhesion-laver 16 on an x-ray window 14 (see FIGS. 3-4, 21, 28);
- depositing a target 17 on the adhesion-layer 16 with a gap 21 on the x-ray window 14 that is free of the target 17 and encircles the target 17, and the target 17 is configured to generate x-rays in response to impinging electrons from an electron-emitter 11*e*; (see FIGS. 5, 23, 28)
- depositing a conductive-layer 18 on the x-ray window 14 in the gap 21, the conductive-layer 18 adjoins the target 17, and the conductive-layer 18 is electrically conductive (see FIGS. 6, 24, 29); and
- mounting the x-ray window 14 on a flange 19 of an anode 12 for an x-ray tube by a sealing-layer 13, the flange 19 encircles an aperture 22, the x-ray window 14 spans the aperture 22, and the target 17 is spaced apart from the flange 19 by the gap 21 (see FIGS. 7, 25,26).

The gap 21 can be free of the adhesion-layer 16, and the conductive-layer 18 can be deposited on ≥5% and ≤50% of the gap. See FIG. 27.

The adhesion-layer 16 can extend into the gap 21, and the conductive-layer 18 can cover ≥75% of the adhesion-layer in the gap. See FIG. 2. The adhesion-layer 16 can span and cover the gap 21. See FIG. 20.

X-Ray Tubes 10 & 80

As illustrated in FIGS. 1 and 8, the adhesion-layer 16 can have multiple, different thicknesses (Ts≠Tt, Tg≠Tt). These thickness differences can result from the methods illustrated in FIGS. 3-7 and 10-18. The adhesion-layer 16 can be sandwiched between the sealing-layer 13 and the x-ray window 14, thus improving this hermetic seal.

As illustrated in FIGS. 3-7, a first-adhesion-layer 16*a* can be applied on the x-ray window 14. The vacuum chamber can be opened for deposition of a mask 41. The first-adhesion-layer 16*a* can oxidize. The x-ray window 14 can be reinserted into the vacuum chamber. A second-adhesion-layer 16*b* can be deposited on the oxidized first-adhesion-layer 16*a* in an opening 42 of the mask 41. The target 17 can then be deposited on the second-adhesion-layer 16*b* in the opening 42 of the mask 41, without opening the vacuum chamber.

Due to depositing the first-adhesion-layer 16*a* across the x-ray window, then depositing the second-adhesion-layer 16*b* in the opening 42 of the mask 41, the adhesion-layer 16 can have multiple, different thicknesses (thicker center).

The x-ray tube 10 of FIGS. 1-2 can be made by the method of FIGS. 3-7. Thus, a maximum thickness Ts of the adhesion-layer 16, between the sealing-layer 13 and the x-ray window 14, can be smaller than a minimum thickness Tt of the adhesion-layer 16, between the target 17 and the x-ray window 14 (Ts<Tt). A maximum thickness Tg of the adhesion-layer 16 in the gap 21 can be smaller than a minimum thickness Tt of the adhesion-layer 16 between the target 17 and the x-ray window 14 (Tg<Tt).

Example relationships between these different thicknesses Ts, Tt, and Tg include the following: 1.1*Ts≤Tt, 1.3*Ts≤Tt, 1.5*Ts≤Tt, 2*Ts≤Tt, or 10*Ts≤Tt; 1.1*Tg≤Tt, 1.3*Tg≤Tt, 1.5*Tg≤Tt, 2*Tg≤Tt, or 10*Tg≤Tt.

As illustrated in FIGS. 10-13, an outer-adhesion-layer 16*o* can be applied immediately before depositing the conductive-layer 18 on it, without opening chamber vacuum. A central-adhesion-layer 16*c* can be applied immediately before mounting the target 17 on it, without opening chamber vacuum. This can avoid oxidation of a surface of the adhesion layer 16*c* and 16*o* before bonding the top layer 17 or 18, thus improving bond strength.

Therefore, the outer-adhesion-layer 16*o* and the central-adhesion-layer 16*c* can be applied in separate steps, to improve bonding. As a result, the adhesion-layer 16 can have multiple, different thicknesses Ts, Tt, and Tg, due to being applied in different steps. These thickness differences are described above (thicker in the center Tt) and below (thinner in the center Tt). The x-ray tubes 10 and 80 of FIGS. 1-2 and 8-9 can be made by the method of FIGS. 10-13.

As illustrated in FIGS. 14-18, the adhesion-layer 16 can be applied on the x-ray window 14. The vacuum chamber can be opened for deposition of a mask 41. The adhesion-layer 16 can oxidize while the vacuum chamber is open. The x-ray window 14 can be reinserted into the vacuum chamber. The adhesion-layer 16 can be etched within an opening 42 of the mask 41, thus removing the oxidation and preparing the adhesion-layer 16 for deposition of the target 17. Due to the etch of the adhesion-layer 16 within the opening 42, then depositing the target 17 in this opening 42, the adhesion-layer 16 can be thinner in its center. The x-ray tube 80 of FIGS. 8-9 can be made by the method of FIGS. 14-18.

Therefore, a minimum thickness Ts of the adhesion-layer 16, between the sealing-layer 13 and the x-ray window 14, can be larger than a maximum thickness Tt of the adhesion-layer 16, between the target 17 and the x-ray window 14 (Ts>Tt). A minimum thickness Tg of the adhesion-layer 16 in the gap 21 can be larger than a maximum thickness Tt of the adhesion-layer 16 between the target 17 and the x-ray window 14 (Tg>Tt).

Example relationships between these different thicknesses Ts, Tt, and Tg include the following: 1.1*Tt≤Ts, 1.3*Tt≤Ts, 1.5*Tt≤Ts, 2*Tt≤Ts, or 10*Tt≤Ts; 1.1*Tt≤Tg, 1.3*Tt≤Tg, 1.5*Tt≤Tg, 2*Tt≤Tg, or 10*Tt≤Tg.

A disadvantage of x-ray tubes 10 and 80 is that material of the sealing-layer 13 can interdiffuse with material of the adhesion-layer 16. In order to minimize this interdiffusion, it is preferable that (a) material of the sealing-layer 13 is different than material of the adhesion-layer 16, (b) the sealing-layer 13 does not include titanium. (c) the adhesion-layer 16 does not include titanium, (d) or combinations thereof.

A potential disadvantage of x-ray tubes 10 and 80 is that the adhesion-layer 16 in the gap 21 can interfere with purity of the desired x-ray spectrum. In order to eliminate or reduce this problem, there can be a conductive-layer 18 on the adhesion-layer 16 in the gap 21. The conductive-layer 18 can block most (FIG. 2) or all (FIG. 9) of the adhesion-layer 16 in the gap 21. The conductive-layer 18 can be made of a material (e.g. tungsten W, Molybdenum Mo, or both) that is less detrimental to the desired x-ray spectrum. The conductive-layer 18 can be between the adhesion-layer 16 and the sealing-layer 13, or can terminate prior to or at an edge of the sealing-layer 13.

If the x-ray window is electrically insulative, then the adhesion-layer 16 and/or the conductive-layer 18 can provide an electrical connection between the target 17 and the anode 12.

An order of layers at an outer ring of the x-ray window 14 can consist of or can include the x-ray window 14, the adhesion-layer 16, the conductive-layer 18, the sealing-layer 13, then the flange 19. An order of layers at a center of the x-ray window 14 can consist of or can include the x-ray window 14, the central-adhesion-layer 16*o*, then the target 17.

In the following method of assembling an x-ray window 14 with a target 17, the steps can be performed in the order described. Components can have properties as described above. Sputter deposition may be used for the deposition steps. The method can include some or all of the following steps.

Step 30 (see FIG. 3) can include depositing a first-adhesion-layer 16*a* on an x-ray window 14.

Step 40 (see FIG. 4) can include applying a mask 41 on the first-adhesion-layer 16*a*. The mask 41 can have an opening 42 that exposes the first-adhesion-layer 16*a*. The opening 42 can be located at a center of the mask 41. Step 40 can further comprise depositing a second-adhesion-layer 16*b* on the first-adhesion-layer 16*a* in the opening 42 of the mask 41.

Step 50 (see FIG. 5) can include depositing a target 17 on the second-adhesion-layer 16*b* in the opening 42 of the mask 41.

Step 60 (see FIG. 6) can include removing the mask 41, applying a second mask 41*s* on the target 17, then applying a conductive-layer 18 on the adhesion-layer 16 in a gap 21 at an outer perimeter of the target 17.

Step 70 (see FIG. 7) can follow step 50 or step 60. Step 70 can include removing the mask 41 or the second mask 41*s*, then hermetically-sealing the x-ray window 14 to a flange 19 of an anode 12 by a sealing-layer 13. The first-adhesion-layer 16*a* can be located between the sealing-layer 13 and the x-ray window 14. The first-adhesion-layer 16*a* can adjoin the sealing-layer 13 to the x-ray window 14. The flange 19 can encircle an aperture 22. The x-ray window 14 can span the aperture 22. The target 16 can be spaced apart from the flange 19 by a gap 21.

The adhesion-layer 16 can be used to bond the sealing-layer 13 to the x-ray window 14. Therefore, step 30 can include deposition of the adhesion-layer 16 across most or all of a face of the x-ray window 14.

It can be useful to keep the target 17 spaced apart from the sealing-layer 13, to avoid interdiffusion of these materials. The mask 41 of step 50 can limit deposition of the target 17 to a center of the adhesion-layer 16.

During application of the mask 41, the adhesion-layer 16 can oxidize, which can interfere with adhesion of the target 17 to the adhesion-layer 16. In order to resolve this problem, the second-layer 16*b* of the adhesion-layer 16 can first be applied within the mask 41, then the target 17 can be applied on top of the second-layer 16*b* without breaking vacuum, and thus without oxidation of a surface of the second-layer 16*b*.

In the following method of assembling an x-ray window 14 with a target 17, the steps can be performed in the following order. Components can have properties as described above. Sputter deposition may be used for the deposition steps. The method can include some or all of the following steps:

Step 100 (see FIG. 10) can include depositing an outer-adhesion-layer 16*o* on the x-ray window 14, then depositing a conductive-layer 18 on the outer-adhesion-layer 16*o*. The outer-adhesion-layer 16*o* and the conductive-layer 18 can form a ring 92 with an aperture 91 exposing the x-ray window 14.

Step 110 (see FIG. 11) can include depositing a central-adhesion-layer 16*c* on the x-ray window 14 in the aperture 91.

Step 120 (see FIG. 12) can include depositing a target 17 on the central-adhesion-layer 16*c*. The target 17 can be deposited in the aperture 91.

Step 130 (see FIG. 13) can include mounting the x-ray window 14 on a flange 19 of an anode 12 for an x-ray tube 70 by a sealing-layer 13.

The aperture 91 can be formed by applying a mask on a central region of the x-ray window 14, then depositing the outer-adhesion-layer 16*o* then the conductive-layer 18 around a perimeter of the mask. Alternatively, the aperture 91 can be formed by depositing the outer-adhesion-layer 16*o* then the conductive-layer 18 across a face of the x-ray window 14, then etching a central region of the outer-adhesion-layer 16*o* and the conductive-layer 18 to form them into a ring 92 with the aperture 91 exposing the x-ray window 14.

This method can result in different thicknesses of the outer-adhesion-layer 16*o* with respect to the central-adhesion-layer 16*c* (Ts≠Tt, Tg≠Tt), because they are deposited in different steps (100 & 110).

In the following method of assembling an x-ray window 14 with a target 17, the steps can be performed in the following order. Components can have properties as described above. Sputter deposition may be used for the deposition steps. The method can include some or all of the following steps:

Step 110 (see FIG. 11) can include depositing a central-adhesion-layer 16*c* on the x-ray window 14. Step 120 (see FIG. 12) can include depositing a target 17 on the central-adhesion-layer 16*c*. The central-adhesion-layer 16*c* and the target 17 can be located in a central region of the x-ray window 14, with a ring 92 on the x-ray window encircling the central-adhesion-layer and the target.

Step 100 (see FIG. 10) can include depositing an outer-adhesion-layer 16*o* on the x-ray window 14, then depositing a conductive-layer 18 on the outer-adhesion-layer 16*o*. The outer-adhesion-layer 16*o* and the conductive-layer 18 can be deposited in the ring 92. The ring 92 can encircle an aperture 91. The central-adhesion-layer 16*c* and the target 17 can be located in the aperture 91.

Step 130 (see FIG. 13) can include mounting the x-ray window 14 on a flange 19 of an anode 12 for an x-ray tube 70 by a sealing-layer 13.

The aperture 91 can be formed by applying an annular mask with a central aperture. Alternatively, the central-adhesion-layer 16*c* and the target 17 can be deposited across a face of the x-ray window 14, then an outer ring of the central-adhesion-layer 16*c* and the target 17 can be removed by etching.

The outer-adhesion-layer 16*o* and the conductive-layer 18 can form a ring around the aperture 91 by use of a second mask (not shown) on the target 17, or by depositing across a face of the x-ray window 14, then etching a central region.

This method can result in different thicknesses of the outer-adhesion-layer 16*o* with respect to the central-adhesion-layer 16*c* (Ts≠Tt, Tg≠Tt), because they are deposited in different steps (100 & 110).

In the following method of assembling an x-ray window 14 with a target 17, the steps can be performed in the following order. Components can have properties as described above. Sputter deposition may be used for the deposition steps. The method can include some or all of the following steps:

Step 140 (see FIG. 14) can include depositing an adhesion-layer 16 on the x-ray window 14. Depositing the adhesion-layer 16 can be performed in a vacuum of a vacuum chamber.

Step 150 (see FIG. 15) can include deposition of a mask 41 on the adhesion-layer 16, then etching the adhesion-layer 16 within an opening 42 of the mask 41. Step 150 can follow step 140. The vacuum chamber can be opened after step 140, and closed and a vacuum pulled before etching the adhesion-layer 16.

Step 160 (see FIG. 16) can include deposition of a target 17 on the central-adhesion-layer 16 within the opening 42 of the mask 41, then removing the mask 41. Step 160 can follow step 150. Steps 150 then 160 can be performed without opening the vacuum chamber or breaking vacuum between these steps 150 and 160.

Step 170 (see FIG. 17) can include applying a second mask 41*s* on the target 17: depositing a conductive-layer 18 on the outer-adhesion-layer 16, encircling the target 17; and then removing the second mask 41*s*. Step 170 can follow step 160.

Step 180 (see FIG. 18) can include mounting the x-ray window 14 on a flange 19 of an anode 12 for an x-ray tube 70 by a sealing-layer 13. Step 180 can follow step 160 or step 170.

This method can result in different thicknesses of the outer-adhesion-layer 16*o* with respect to the central-adhesion-layer 16*c* ($Ts \neq Tt$, $Tg \neq Tt$).

X-Ray Tube 190

As illustrated in FIGS. 19-20, the target 17 can be spaced apart from the sealing-layer 13 by a gap 21. The adhesion-layer 16 can span the gap 21 from the target 17 to the sealing-layer 13. The adhesion-layer 16 can have a consistent thickness (consistent within normal manufacturing tolerances) across a face of the x-ray window 14. There can be a conductive-layer 18 on the adhesion-layer 16 in the gap 21.

An order of layers at an outer ring of the x-ray window 14 can consist of or can include the x-ray window 14, the adhesion-layer 16, the conductive-layer 18, the sealing-layer 13, then the flange 19. An order of layers at a center of the x-ray window 14 can consist of or can include the x-ray window 14, the adhesion-layer 16, then the target 17. X-ray tube 190 is preferred for fewer layers at a center of the x-ray window 14. A disadvantage of x-ray tube 190 is increased complexity of manufacturing.

In the following method of assembling an x-ray window 14 with a target 17, the steps can be performed in the order described. Components can have properties as described above. Sputter deposition may be used for the deposition steps. The method can include some or all of the following steps:

Step 210 (see FIG. 21) can include depositing an adhesion-layer 16 across a face of an x-ray window 14.

Step 220 (see FIG. 22) can include applying a mask 41 on the adhesion-layer 16. The mask 41 can have an opening 42 that exposes the adhesion-layer 16. The opening 42 can be located at a center of the mask 41. The mask 41 can be applied without opening the vacuum chamber.

Step 230 (see FIG. 23) can include depositing a target 17 on the adhesion-layer 16 in the opening 42 of the mask 41, then removing the mask 41.

Step 240 (see FIG. 24) can include applying a second mask 41*s* on the target 17, applying a conductive-layer 18 on the adhesion-layer 16 at an outer perimeter of the target 17 then removing the second mask 41*s*.

Step 250 (see FIG. 25) can follow step 230 or step 240. Step 250 can include hermetically-sealing the x-ray window 14 to a flange 19 of an anode 12 by a sealing-layer 13. The adhesion-layer 16 can be located between the sealing-layer 13 and the x-ray window 14.

The adhesion-layer 16 can be used to bond the sealing-layer 13 to the x-ray window 14. Therefore, step 210 can include deposition of the adhesion-layer 16 across most or all of a face of the x-ray window 14.

It can be useful to keep the target 17 spaced apart from the sealing-layer 13, to avoid interdiffusion of these materials. The mask 41 of step 220 can limit deposition of the target 17 to a center of the adhesion-laver 16.

X-Ray Tube 260

As illustrated on x-ray tube 260 in FIGS. 26-27, there can be a gap 21 between the flange 19 and the adhesion-layer 16, and between the flange 19 and the target 17. This gap 21 can help avoid interdiffusion of materials of the target 17 and adhesion-layer 16 with the sealing-layer 13. If the x-ray window 14 is electrically insulative, then a conductive-layer 18 can provide an electrical connection between the target 17 and the anode 12. The adhesion-layer 16 can be applied in a single step, thus simplifying manufacturing.

A disadvantage of this x-ray tube 260 is difficulty and cost of deposition of the conductive-layer 18 on the x-ray window 14.

Another disadvantage of this x-ray tube 260 is difficulty of bonding the sealing-layer 13 to the x-ray window 14. Titanium can be used in the sealing-layer 13 to overcome this difficulty. Titanium has a strong tendency to interdiffuse with material of the target 17 and the adhesion-layer 16; but the gap 21 can prevent this interdiffusion. The adhesion-layer 16 and/or the target 17 can include titanium due to this gap 21.

In the following method of assembling an x-ray window 14 with a target 17, the steps can be performed in the order described. Components can have properties as described above. Sputter deposition may be used for the deposition steps. The method can include some or all of the following steps:

Step 280 (see FIG. 28) can include depositing an adhesion-layer 16 on an x-ray window 14, and depositing a target 17 on the adhesion-layer 16. The adhesion-layer 16 and the target 17 can be deposited on a center of the x-ray window 14.

The adhesion-layer 16 can be narrow as illustrated in FIGS. 26 and 28, or the adhesion layer 16 can be wide as illustrated in FIG. 19. Clamping at an outer edge of the x-ray window 14 might prevent the adhesion-layer 16 from being as wide as the x-ray window 14.

A gap 21 where the adhesion-layer 16, the target 17, or both are not desired can be masked during deposition. Alternatively, a desired region for keeping the adhesion-layer 16, the target 17, or both can be masked after deposition, and an unmasked region can be removed by etching.

Step 290 (see FIG. 29) can include depositing a conductive-layer 18 on the x-ray window 14 in the gap 21. A mask 301 is illustrated in FIG. 30 with openings 302 where the conductive-layer 18 can be deposited. Opening size can be modified to form the conductive-layer 18 into a shape as illustrated in FIG. 27.

Another step (see FIG. 26) can include mounting the x-ray window 14 on a flange 19 of an anode 12 for an x-ray tube 260. This step can include hermetically-sealing the x-ray window 14 to the flange 19 by a sealing-layer 13.

Example 310

As illustrated in FIGS. 31-32, a stack of layers at a center of the x-ray window 14 can include the following layers in the following order: the x-ray window 14, a first-adhesion-layer 16*a*, a conductive-layer 18, a second-adhesion-layer 16*b*, then a target 17.

An order of layers at an outer ring of the x-ray window 14 can include the following layers in the following order: the x-ray window 14, the first-adhesion-layer 16*a*, the conductive-layer 18, the sealing-layer 13, then the flange 19.

The first-adhesion-layer 16*a* can help the conductive-layer 18 adhere to the x-ray window 14. The second-adhesion-layer 16*b* can help target 17 adhesion.

The first-adhesion-layer 16*a* and the conductive-layer 18 can extend across the x-ray window 14. The second-adhesion-layer 16*b* and the target 17 can be deposited in a center of the x-ray window 14, with a gap 21 encircling these layers 16*b* and 17. The first-adhesion-layer 16*a* and the conductive-layer 18 can span the gap 21 from the target 17 to the sealing-layer 13.

Depositing the first-adhesion-layer 16*a* and the conductive-layer 18 across most or all of a face of the x-ray window 14 can simplify manufacturing. A disadvantage of this example is that x-rays generated in the target 17 would need to transmit through two adhesion-layers 16*a* and 16*b* plus the conductive-layer 18.

In the following method of assembling an x-ray window 14 with a target 17, the steps can be performed in the order described. Components can have properties as described above. Sputter deposition may be used for the deposition steps. The method can include some or all of the following steps:

Step 330 (see FIG. 33) can include depositing a first-adhesion-layer 16*a* on an x-ray window 14.

Step 340 (see FIG. 34) can include depositing a conductive-layer 18 on the first-adhesion-layer 16*a*. Step 340 can follow step 330.

Step 350 (see FIG. 35) can include applying a mask 41 on the conductive-layer 18, then depositing a second-adhesion-layer 16*b* on the conductive-layer 18 in an opening 42 of the mask 41. Step 350 can follow step 340.

Step 360 (see FIG. 36) can include depositing a target 17 on the second-adhesion-layer 16*b* in the opening 42 of the mask 41, then removing the mask 41. Step 360 can follow step 350.

Another step (see FIG. 31) can include hermetically-sealing the x-ray window 14 to a flange 19 of an anode 12 by a sealing-layer 13. This step can follow step 360.

What is claimed is:

1. An x-ray tube comprising:

an electron-emitter and an anode, electrically-insulated from each other;

the anode includes a flange encircling an aperture;

an x-ray window hermetically-sealed to the flange, the x-ray window spanning the aperture;

a target mounted by an adhesion-layer on the x-ray window in the aperture, the target faces the electron-emitter and the target is configured to generate x-rays in response to impinging electrons from the electron-emitter;

a gap between the flange and the target, the gap encircling the target;

the x-ray window is hermetically-sealed to the flange by a sealing-layer;

the adhesion-layer spans the gap from the target to the sealing-layer;

the adhesion-layer is located between the sealing-layer and the x-ray window;

the adhesion-layer includes chromium;

the adhesion-layer is free of titanium, the sealing-layer is free of titanium, or both the adhesion-layer and the sealing-layer are free of titanium.

2. The x-ray tube of claim 1, wherein the adhesion-layer includes ≥95 mass percent chromium.

3. The x-ray tube of claim 1, wherein the sealing-layer includes silver and copper.

4. The x-ray tube of claim 3, wherein the sealing-layer further comprises titanium.

5. The x-ray tube of claim 1, wherein the target is mounted on a center of the x-ray window in the aperture.

6. The x-ray tube of claim 1, further comprising a conductive-layer on the adhesion-layer in the gap, and the conductive-layer includes tungsten, molybdenum, or both.

7. The x-ray tube of claim 6, wherein the conductive-layer covers ≥50% of the gap.

8. The x-ray tube of claim 1, wherein the x-ray window includes diamond.

9. An x-ray tube comprising:

an electron-emitter and an anode, electrically-insulated from each other;

the anode includes a flange encircling an aperture;

an x-ray window hermetically-sealed to the flange by a sealing-layer, the x-ray window spanning the aperture;

a target mounted by an adhesion-layer on the x-ray window in the aperture, the target faces the electron-emitter and the target is configured to generate x-rays in response to impinging electrons from the electron-emitter;

an annular gap between the flange and the target, the gap encircles the target;

the adhesion-layer spans the gap between the flange and the target, and is located between the sealing-layer and the x-ray window; and a thickness of the adhesion-layer between the sealing-layer and the x-ray window is different from a thickness of the adhesion-layer between the target and the x-ray window.

10. The x-ray tube of claim 9, wherein 1.3*Ts≤Tt or Ts≥1.3*Tt, where Ts is a maximum thickness of an outer-adhesion-layer between the sealing-layer and the x-ray window, and Tt is a minimum thickness of a central-adhesion-layer between the target and the x-ray window.

11. The x-ray tube of claim 10, wherein 1.3*Tg≤Tt or Tg≥1.3*Tt, where Tg is a maximum thickness of the outer-adhesion-layer in the gap.

12. The x-ray tube of claim 9, further comprising:

a conductive-layer on the adhesion-layer in the gap, the conductive-layer spans the gap from the target to the sealing-layer; and the conductive-layer includes tungsten, molybdenum, or both.

13. The x-ray tube of claim 12, wherein an order of layers at an outer ring of the x-ray window includes the x-ray window, the adhesion-layer, the conductive-layer, the sealing-layer, then the flange.

14. The x-ray tube of claim 9, wherein the sealing-layer, the adhesion-layer, or both are free of titanium.

15. The x-ray tube of claim 9, wherein the adhesion-layer includes ≥95 mass percent chromium.

16. The x-ray tube of claim 9, wherein the aperture is free of the sealing-layer.

17. The x-ray tube of claim 9, wherein the sealing-layer is in a non-contacting relationship with the target.

18. The x-ray tube of claim 9, wherein the target is mounted on a center of the x-ray window in the aperture.

19. The x-ray tube of claim 9, wherein the x-ray window includes ≥ 90 mass percent diamond.

20. The x-ray tube of claim 9, further comprising:

the sealing-layer comprises silver, copper, and titanium;

the gap is free of the target and the adhesion-layer;

a conductive-layer on the adhesion-layer in the gap, the conductive-layer spans the gap from the target to the sealing-layer; and the conductive-layer includes tungsten, molybdenum, or both.

* * * * *